United States Patent [19]
Querfurth et al.

[11] 3,971,130
[45] July 27, 1976

[54] ELECTRIC GRASS SICKLE-SHEAR

[75] Inventors: William M. Querfurth, Niles, Ill.;
Michael A. Schwartz, Willoughby Hills, Ohio; Jon C. Wiltberger, Round Lake, Ill.

[73] Assignee: Burgess Vibrocrafters, Inc., Grayslake, Ill.

[22] Filed: Sept. 30, 1974

[21] Appl. No.: 510,374

[52] U.S. Cl. .................................. 30/220; 30/224
[51] Int. Cl.² ..................................... B26B 19/02
[58] Field of Search .............. 30/DIG. 1, 500, 210, 30/218, 220, 221, 222, 223, 224, 225, 228, 216

[56] References Cited
UNITED STATES PATENTS

| | | |
|---|---|---|
| 636,146 | 10/1899 | Hume .............................. 30/221 X |
| 2,775,857 | 1/1957 | Holmes ............................ 30/216 X |
| 3,218,710 | 11/1965 | Bruck .................................. 30/222 |
| 3,623,223 | 11/1971 | Edgell ................................. 30/220 |
| 3,631,596 | 1/1972 | Glans .................................. 30/228 |
| 3,774,302 | 11/1973 | Ketchpel .......................... 30/216 X |

*Primary Examiner*—Al Lawrence Smith
*Assistant Examiner*—J. C. Peters
*Attorney, Agent, or Firm*—Darbo, Robertson & Vandenburgh

[57] ABSTRACT

The single-toothed blade is pivoted at its rear end and driven at its middle section in arcuate reciprocation over the teeth of a fixed base plate by an electric motor. The blade and the slide of the crank-slide blade drive mechanism comprise the wear parts of the sickle-shear and as a subassembly is readily detachable from the crankpin for rapid replacement without the use of tools.

16 Claims, 9 Drawing Figures

U.S. Patent    July 27, 1976    Sheet 1 of 3    3,971,130
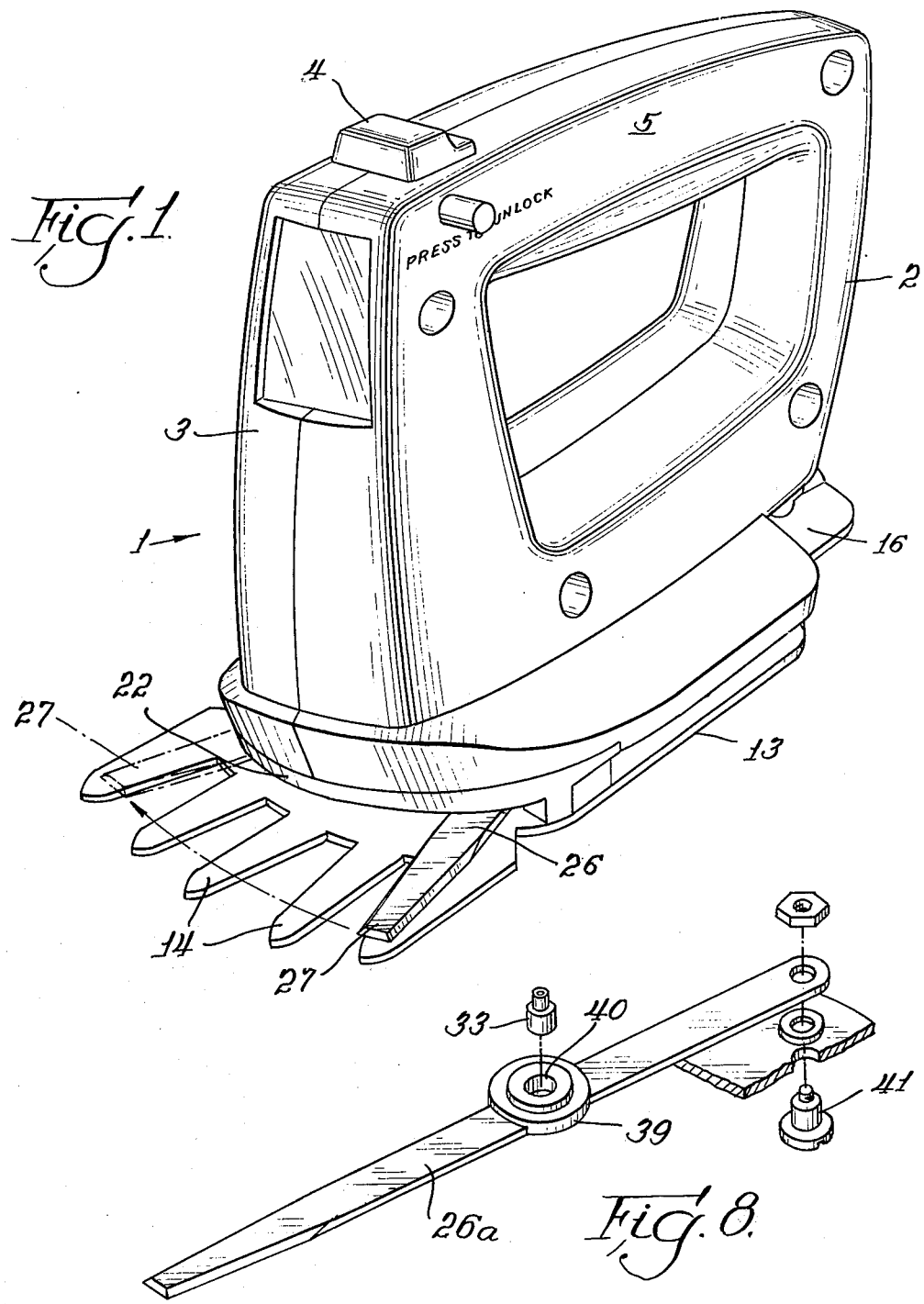
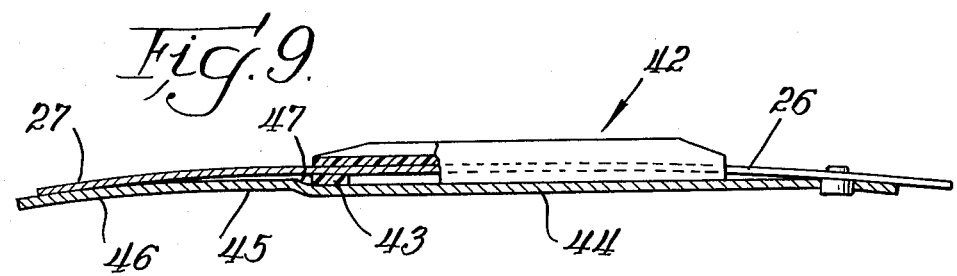

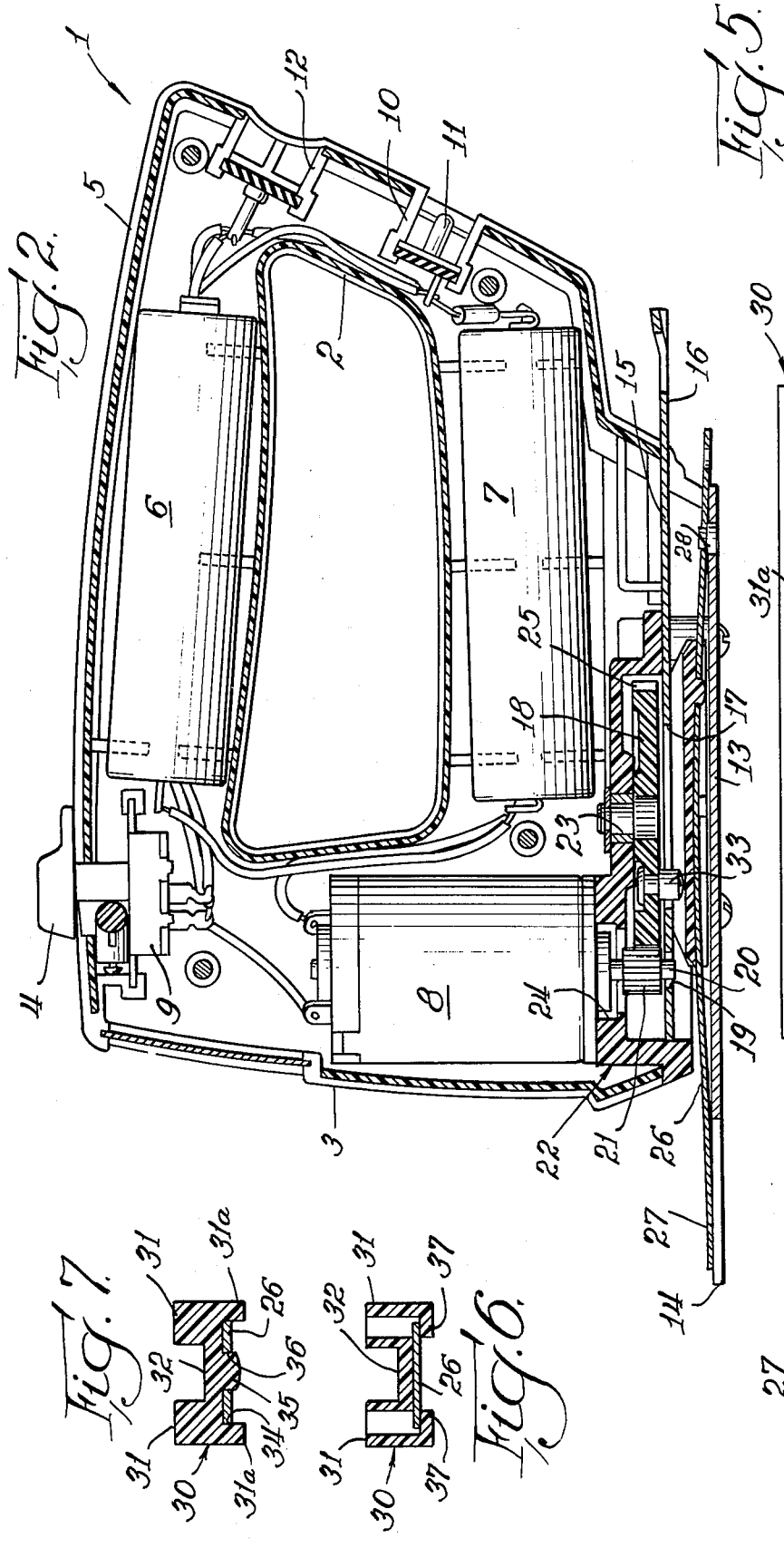

ELECTRIC GRASS SICKLE-SHEAR

BACKGROUND AND SUMMARY OF THE INVENTION

Several electrically driven hand-held grass shears are on the market. In general, they have a fixed base plate having a plurality of spaced teeth projecting forwardly from the tool and a cutting blade which is pivoted at its middle section and driven at its rear end for arcuate reciprocation with respect to the base plate. This driven blade also has a plurality of teeth, usually one less than the base plate, and movement is limited to the distance between two adjacent base plate teeth. The grass which enters between the teeth of the base plate as the tool is moved forwardly is cut by a shearing action.

As the teeth of the cutting blades become dull with use, they may be sharpened or the entire blade may be replaced. This operation has required the removal of the base plate or equivalent operation. The disassembly, blade replacement and reassembly, while relatively simple operations, are sometimes beyond the limited capabilities of the users of the equipment. Also, the time required frequently means that the tool is operated with a dull blade with consequent poor performance.

The electrically driven shears must be regarded as inherently dangerous. Great care must be exercised in their use. In spite of safety catches usually provided, there is also the danger that a curious child will pick up the tool from its storage place and manage to close the switch and possibly be badly injured.

One of several objects of the present invention is to provide an electrically driven grass cutter which operates with a combination sickle and shear action giving superior results. More specifically, a cutting blade having a single tooth accelerates rapidly and attains high speeds in passing over the fixed teeth to cut with a sickle action as well as with shear action involvement.

An object of prime importance is the provision of a grass sickle-shear which is so constructed that the cutting blade may be removed and replaced with a new blade in a matter of seconds and without the use of tools. Another object is to provide for the ready replacement of the wear part of the drive mechanism. This is accomplished by providing a blade-slide subassemmbly as a replacement part.

A related object of great importance is to provide an electrically driven grass cutter from which the cutting blade may be so easily and quickly removed that it is feasible to keep the blade in a safe and separate place while the machine is stored so that the danger of injury to children is completely eliminated. Only seconds are required to replace the blade in the machine to ready it for use.

A further and important object is to provide a grass cutter of the type described wherein the radius of arcuate reciprocation of the cutting blade is maximum whereby the tendency to push grass stems out beyond the teeth rather than to cut them is minimized.

Other features of operation and construction of the electric grass sickle-shear will become apparent as the following detailed description proceeds.

DESCRIPTION OF THE DRAWINGS

In the accompanying drawings:

FIG. 1 is a perspective view of the electric grass sickle-shear of the invention showing the single-toothed cutting blade;

FIG. 2 is a longitudinal sectional view of the sickle-shear;

FIGS. 4 and 5 are cross-sectional and bottom views, (respectively), of the cutting blade-slide subassembly;

FIGS. 6 and 7 are detail views in cross-section taken at the lines 6—6 and 7—7, respectively, of FIG. 4;

FIG. 8 is a detail view of an alternative form of cutting blade and mechanical transmission, and FIG. 9 is a detail view, in cross-section, showing a modified design of the cutting mechanism.

DESCRIPTION OF SPECIFIC EMBODIMENTS

Figure 3:
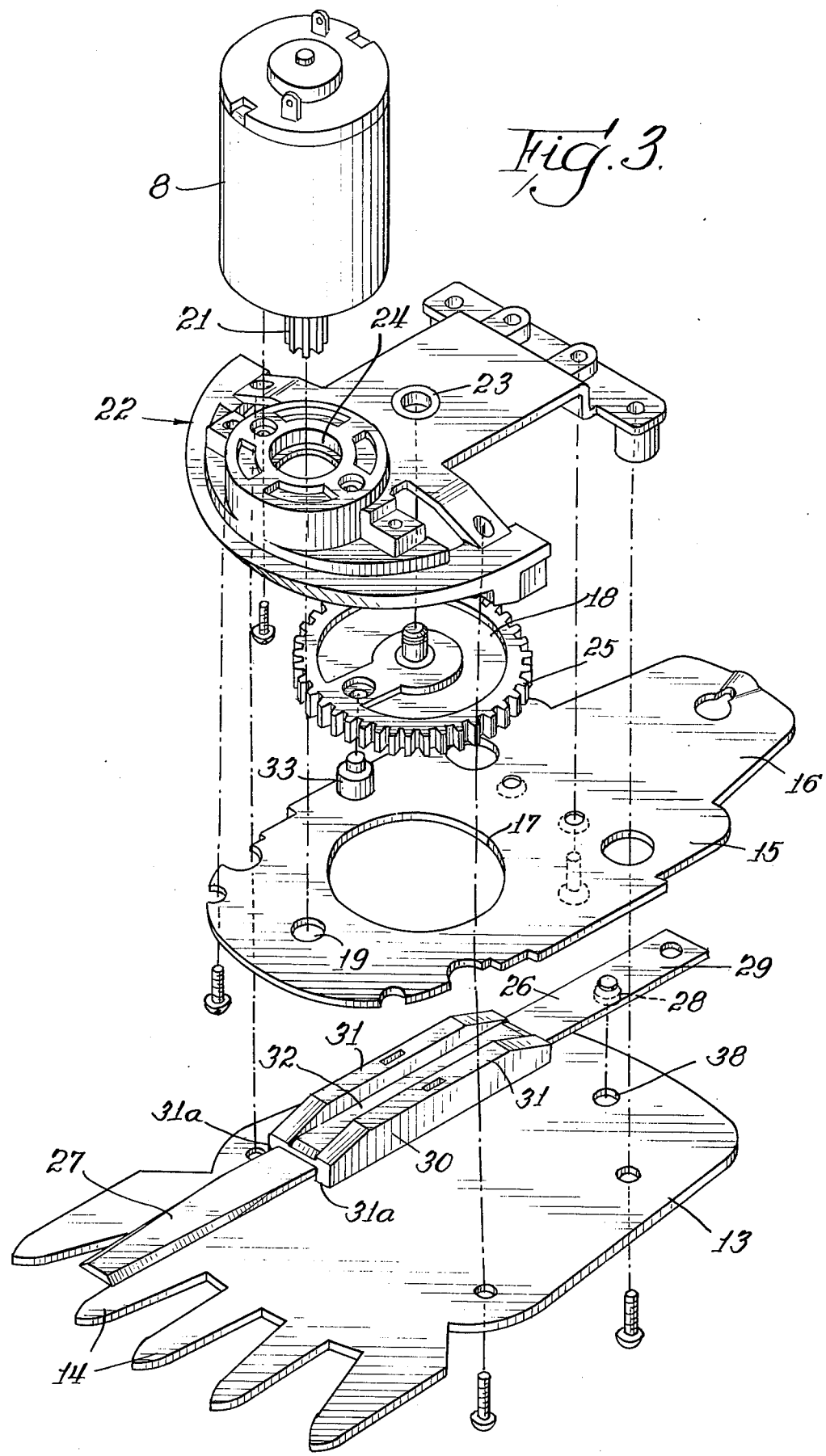
FIG. 3 is an exploded view of the operating mechanism.

The mechanism and electrical connections of the sickle-shear are contained within a housing 1 comprising halves 2 and 3 which may conveniently be plastic mouldings. A control switch button 4 is located for convenient operation at the forward end of handle 5. Batteries 6 and 7 are arranged as shown in FIG. 2 with necessary electrical connections to motor 8 through switch 9. A socket 10 having a pair of prongs 11 connected with the batteries through a diode circuit is provided for recharging the batteries with rectified D.C. current. A socket 12 provides for connection of a detachable extension handle (not shown herein but described in U.S. Pat. No. 3,759,020) which is equipped with a control switch electrically connected in parallel with switch 9 for independent remote control of the operation of the clipper.

The bottom of the housing is covered by base plate 13, the forward end of which is provided with a comb comprising a plurality of spaced teeth 14. A cover plate 15 closes the housing under the mechanism and is provided with a tongue 16 which projects at the rear of the housing to receive and support a detachable extension handle when used. A circular opening 17 provides clearance for the drive crank wheel 18 and a smaller opening 19 accommodates the shaft 20 of motor 8 and drive pinion 21.

A frame 22, which may also be a plastic moulding, is securely fastened to the housing and supports motor 8. Crank wheel 18 is journaled at 23 in frame 22 and drive pinion 21 on motor shaft 20 extends through opening 24 to mesh with teeth 25 of crank wheel 18.

Cutting blade 26 is a relatively thin, flexible strip of steel having a tapering forward end sharpened along its edges to form a single double-edged tooth 27. A pivot 28 is permanently fastened to the blade 26 extending downwardly therefrom and a handle portion 29 extends rearwardly of the pivot and beyond the rear edge of base plate 13 for purposes hereinafter to be described.

A slide 30, forming a part of a crank-slide drive transmission, is fitted and secured upon blade 26 at the middle portion thereof to form a separate subassembly. Shoulders 31 define a groove or way 32 which is equal in width to the diameter of crankpin 33 and is adapted to permit reciprocation of the crankpin therein to convert the circular motion of the motor to arcuate reciprocating motion of cutting blade 26 about pivot 28.

As is best seen in FIGS. 4–7, the plastic slide 30 has integral flanges 31a projecting down along the sides thereof to define a blade-receiving groove 34. A projection 35, also integral with the slide, fits snugly into a corresponding hole 36 in the blade to secure the blade and slide against relative longitudinal movement. To complete the secure gripping of the blade by the slide, lugs 37 extend toward each other from flanges 31a of the slide, being spaced from the bottom of groove 34 the thickness of blade 26. As is best seen in FIG. 4, the blade, as it is held in groove 34 of the slide, is slightly curved. It may either have been pre-formed with such curvature or it may be distorted when inserted in the slide, the floor of groove 34 being correspondingly curved.

When the sickle-shear is assembled, crankpin 33 projects into slide groove 32 so that when switch 9 is closed to energize motor 8 and crank wheel 18 is driven in rotation by pinion 21, this rotary motion is converted to arcuate reciprocating motion of blade 26 by the action of crankpin 33 in the groove 32 of slide 30. The center of the arcuate reciprocation is the center of hole 38 in base plate 13 into which pivot 28 projects. In its assembled position, blade 26 is distorted somewhat by the downward pressure of crankpin 33 on the slide so that the blade acts as a leaf spring to continuously urge pivot 28 into hole 38 and the tooth 27 into spring pressure contact with teeth 14.

The movement of blade 26 varies with simple harmonic motion over the range indicated in broken lines in FIG. 1 from full stop at each extremity of its movement to maximum speed at the middle portion of the array of teeth 14. As the sickle-shear is moved forwardly, grass brought into the cutting zones between teeth 14 is cut by a combination of shearing action along the edges of teeth 14 engaged by sharpened edges of tooth 27 and sickle action resulting from the high speed at which the blade tooth is travelling across the middle portion of teeth 14. Location of the drive between the pivot and the cutting tooth provides a lever geometry which results in multiplication of the range and speed of movement of the blade tooth.

When the cutting edges of blade 26 have become dull due to use, it may be easily and quickly replaced by a new blade. To do this, switch button 4 is locked in open circuit position and the used blade is removed by withdrawing pivot 28 from hole 38 by the application of manual pressure to the projecting handle portion 29 of the blade and pulling the blade out of engagement with crankpin 33. This is accomplished easiest by holding the sickle-shear upside down, pressing downwardly on the handle end 29 of the blade against its spring pressure and pulling the blade-slide assembly out through the rear of the sickle-shear. The replacement blade may then be inserted by lining crankpin 33 up with groove 32 of the slide of the new blade and pushing the blade-slide subassembly forwardly until the pivot 28 snaps into hole 38. The sickle-shear is then ready for use, the entire blade replacement operation requiring only seconds to accomplish.

With replacement of the blade, the wear part of the motion transmission, slide 30, is also simultaneously replaced so that there is never any necessity of giving special attention to the transmission mechanism due to wear. Thus, the two parts of the sickle-shear that wear with use are both easily and quickly replaced by the insertion of a new blade-slide subassembly.

In the alternative arrangement of blade drive illustrated in FIG. 8, slide 39 has a hole 40 to receive crankpin 33. The blade 26a is pivoted by means of bolt 41 at its rear end. With rotation of crank wheel 18, the blade is driven in arcuate reciprocation, slide 39 sliding back and forth along the middle portion of the blade in response to the rotary movement of crankpin 33.

If desired, the blade pivot arrangement described in connection with FIGS. 1–7 may be employed instead of a positive bolt 41.

Another modified form of the cutting parts of the sickle-shear is illustrated in FIG. 9. It is designed to operate quietly and with less wear on the cutting edges of the blade. The slide 42 extends a greater distance forwardly on the blade 26 and is provided with an antifriction pad 43 as an integral part of the slide, a slot being provided to accommodate the blade. Base plate 44 is offset to elevate somewhat the forward portion 45 and the teeth 46 very nearly conform to the configuration of the engaging tooth 27 of blade 26. A shoulder 47 is formed at the offset of the base plate. This shoulder serves the useful purpose of stopping the forward movement of a new blade being inserted into the sickle-shear at exactly the point at which the pivot is lined up with the hole 38 so that no adjustment is necessary to position the pivot into the hole.

In the arrangement of FIG. 9, the reaction to the downward thrust of the driving crankpin 33 upon the slide 42 at the forward end of the blade is divided between the pad 43 and the tooth 27. The pad slides back and forth easily upon the surface of plate 44 that it engages. Both the angle and pressure of engagement of tooth 27 with the fixed teeth 46 are less than the corresponding dimensions of the arrangement of FIGS. 1–7, resulting in less wear and quieter operation. Nevertheless, the resistance to separation of the cooperating shearing teeth is approximately the same because the effective length of the blade leaf spring of FIG. 9 is that from the pad to the end of the tooth, whereas the length in the construction of FIGS. 1–7 is the distance from the point of contact of the crankpin 33 with the slide to the end of the tooth.

In all embodiments of the invention, the slider is preferably made from a plastic material having high lubricity, such as Delrin or Nylon. Friction between the driving crankpin and the driven slide is thus minimized. Since the slide is replaced each time that a new blade is inserted into the sickle-shear, maximum lubricity may be provided with only secondary consideration given to wear qualities of the plastic material. The crankpin may be provided of metal which is sufficiently hard to ensure usability for the life of the machine.

ACHIEVEMENT

The sickle-shear of this invention provides an exceptionally efficient cutting machine as a result of its unique features of construction. The blade is much lighter in weight than the conventional blade having several teeth so that its inertia is correspondingly less and it may be driven with correspondingly greater speed by a motor and drive transmission of reasonable size in a portable tool. The high speed at which the cutting tooth is moved over the middle portion of the fixed base plate teeth results in a sickle cutting action, whereas the relatively slower movement at the limits of the arc effects cutting by a predominantly shearing or scissors action in cooperation between the moving and fixed teeth. This variety of mode of cutting operation is desirable in that a wide variety of growth, including relatively heavy or hard stems as well as blades of grass are cut by the tool although the different types of growth may resist cutting by one or the other of the modes of operation.

Location of the pivot of the arcuate reciprocation at the rear extremity of the blade also contributes to the efficiency of the cutting action. Both the radius and length of the arc traversed are at their maximum for a given size of tool as contrasted with the conventional arrangement in which the pivot of arcuate reciprocation is at the middle portion of the blade and the drive is at the rear end.

A major achievement of the invention lies in the simplicity and speed with which a worn blade may be replaced in the machine. Since the pivot may be disengaged from the hole in which it turns without the use of any tool, all that is needed is the replacement blade. Depression of the projecting end of the blade sufficiently to withdraw the pivot from the hole in which it operates followed by withdrawal of the used blade from the crankpin and the reverse operation to insert the replacement blade requires less than twenty seconds for accomplishment. The ease with which the replacement may be accomplished encourages the use of an adequately sharp blade at all times with resulting operation at maximum cutting efficiency.

Although replacement blades may be supplied separate from the slider and the latter re-used with the replacement blade, provision of the subassembly of slider and blade is feasible in view of the relatively low cost of the slider element and convenience and safety considerations are favorably met by the provision of the subassembly as the replacement part. The sickle-shear of the invention requires practically no maintenance other than the occasional replacement of the blade with the concurrent replacement of the slider.

The ease and minimal cost of replacing the slide constitutes a feature of the invention second in importance only to the ready replaceability of the blade. In designing the machine for maximum operating efficiency and useful life, it is not necessary to make compromises which impair the quality of the tool in order to avoid wear on the slide as a part of the driving mechanism because greater wear can be tolerated since the part is easily and inexpensively replaceable as often as the blade is replaced. The end result is a tool which promises a continuing high level of operating efficiency and dependability throughout a very long and useful life.

An electrically operated device, such as a grass shear, is always attractive to children as a plaything. Although a safety catch is usually provided to prevent unintended closing of the switch, children invariably push and pull on everything until something happens, and with a grass shear this could be a very serious injury. Many parents either keep the machine in a locked storage place or simply refrain from owning one. By reason of the ease and speed with which the cutting blade can be entirely removed from the sickle-shear, separately kept in a safe place inaccessible to children, and then easily and quickly replaced in the machine for use, the great danger to children can be completely eliminated.

We claim:

1. In a portable electric grass shear including a base plate having a plurality of spaced teeth, a cutting blade superjacent said base plate with a cutting tooth substantially in shearing engagement with said teeth, and motor and transmission means for driving said cutting blade, the improvement wherein said cutting blade is demountably pivoted for arcuate reciprocation at the rear end of said base plate and said transmission means includes a slide and a rotary crank having a crankpin drivingly engaging said slide, said slide being elongated and affixed to the blade and having a lengthwise groove into which the crankpin extends, said groove in the slide being open at least at its forward end whereby the slide and blade may be disengaged from the crankpin by withdrawing said blade rearwardly.

2. Structure in accordance with claim 1 wherein the groove in the slide is open at both ends thereof whereby an unobstructed line of sight is provided to line the groove up with the crankpin in inserting the blade and slide into operative position in the shear.

3. Structure in accordance with claim 1 wherein the blade is pivotally attached to the base plate by means of a simple pivot extending into a pivot hole whereby said pivotal attachment can be disengaged by moving said blade away from said plate to draw said pivot out of said hole.

4. Structure in accordance with claim 3 wherein the pivot is affixed to the cutting blade and extends downwardly therefrom near but spaced from the rear end thereof and the pivot hole is provided in the base plate near the rear end thereof.

5. Structure in accordance with claim 3 wherein the blade is resilient and downward pressure is applied at the slide by the crankpin whereby the pivot is continuously urged into the pivot hole to normally maintain pivotal attachment of said blade with the base plate.

6. Structure in accordance with claim 5 wherein the blade as secured to the slide is normally curved with the middle portion spaced above the base plate.

7. Structure in accordance with claim 1 wherein the slide is composed of a plastic material having high lubricity.

8. Structure in accordance with claim 1 wherein the slide is composed of a plastic material having high lubricity and includes an integral pad under the blade at the forward end of said slide, the teeth of the base plate being slightly curved downwardly to almost conform to the configuration of the engaging tooth of the cutting blade.

9. Structure in accordance with claim 8 wherein the base plate is offset rearwardly of the teeth thereof to form a shoulder stop limiting the forward position of the pad and thus of the blade.

10. In a portable electric grass shear including a base plate having a plurality of spaced teeth, a cutting blade superjacent said base plate with a cutting tooth substantially in shearing engagement with said teeth, and motor and transmission means for driving said cutting blade, the improvement wherein said cutting blade is pivoted for arcuate reciprocation at the rear end of said base plate and said transmission means engages and drives said cutting blade forwardly of the blade pivot point, said transmission means including a slide and a rotary crank having a crankpin drivingly engaging said slide, said slide including means preventing relative lateral movement between said blade and said crankpin while permitting relative longitudinal movement between said blade and said crankpin, said slide having a round socket opening at the top thereof into which the crankpin extends, said slide being freely slideable along the blade whereby to drive said blade in arcuate reciprocation with rotation of the crank.

11. Structure in accordance with claim 10 wherein the blade comprises a leaf spring urging the slide upwardly upon the crankpin to maintain engagement of the transmission means.

12. A portable electric grass shear cutting blade and driving element subassembly comprising an elongated thin resilient metal strip cutting blade having both sides of the forward end portion thereof sharpened to form the single and only cutting tooth, and an elongated slide arranged upon the top of the middle portion of said blade and secured thereto against any relative movement therebetween, said slide having a lengthwise groove therein open at at least the forward end thereof.

13. The subassembly of claim 12 wherein the blade as secured to the slide is normally curved with the middle portion thereof higher than the ends.

14. The subassembly of claim 12 wherein the slide is composed of plastic having high lubricity.

15. The subassembly of claim 14 wherein the slide includes an integral pad under the blade at the forward end of said slide.

16. In a portable electric grass shear including a base plate having a plurality of spaced teeth, a cutting blade, and motor and transmission means including a crank-shaft mechanism, the improvement wherein the cutting blade and the slide of the crank-slide mechanism are secured together to form a subassembly which can be inserted into operative position in the grass shear and removed therefrom without disassembling any part of said shear, the blade of said subassembly comprising an elongated thin resilient metal strip having a cutting tooth at its forward end and a pivot affixed thereto near but spaced from the rear end thereof and extending downwardly therefrom, the slide of said subassembly being secured upon the top of said blade at the middle portion thereof and having a lengthwise groove along the top thereof adapted to receive the crankpin of the crank-slide mechanism, the forward end of said groove being open, the base plate having a pivot hole therein near the rear end thereof, the blade in said subassembly being normally curved with the middle portion thereof higher than the ends, the arrangement being such that said pivot can be disengaged from said pivot hole by the manual application of force at the rear end of said blade and said subassembly then withdrawn from engagement with said crankpin and from said shear and a replacement subassembly inserted into operative position therein.

* * * * *